Dec. 18, 1951 W. J. JOHNSON ET AL 2,578,808
POTATO CLEANING AND SEPARATING DEVICE
Filed April 20, 1949 4 Sheets-Sheet 1

INVENTOR.
William J. Johnson,
Lewis H. Buckner,
BY Victor J. Evans & Co.
ATTORNEYS

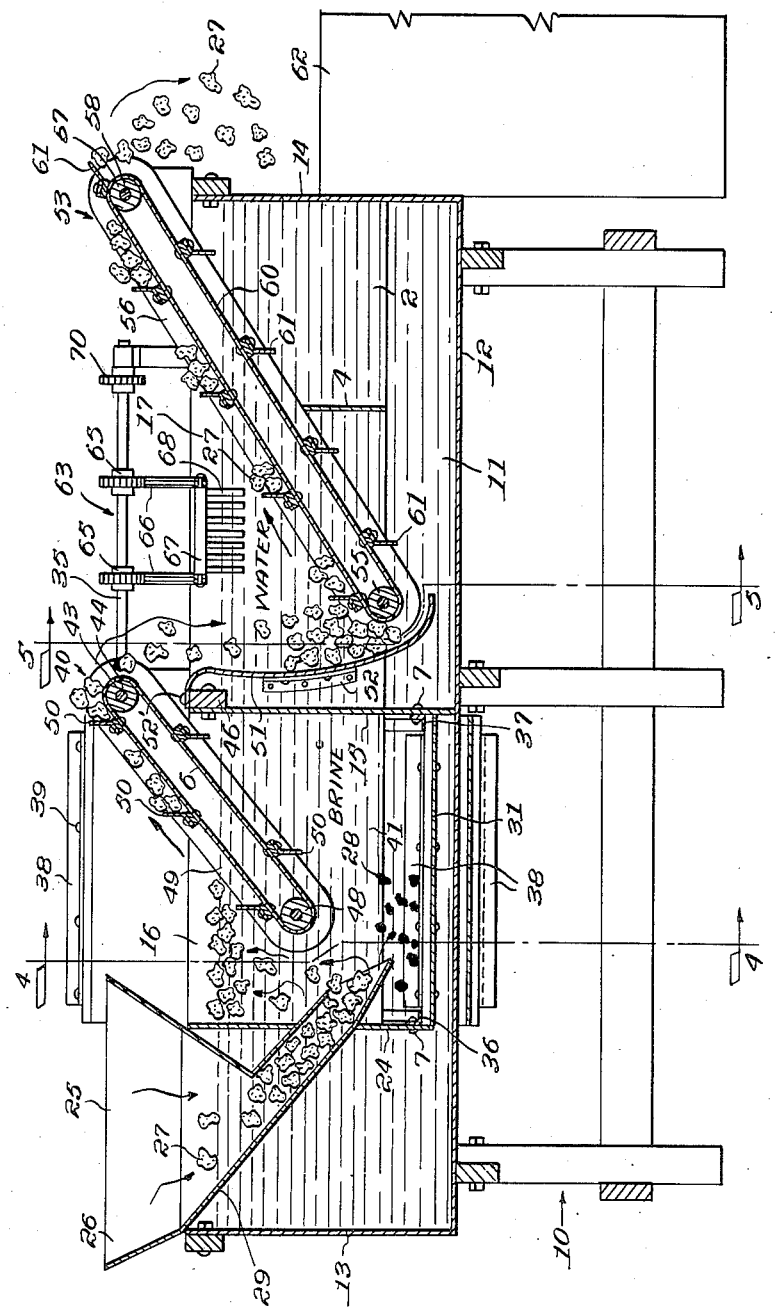

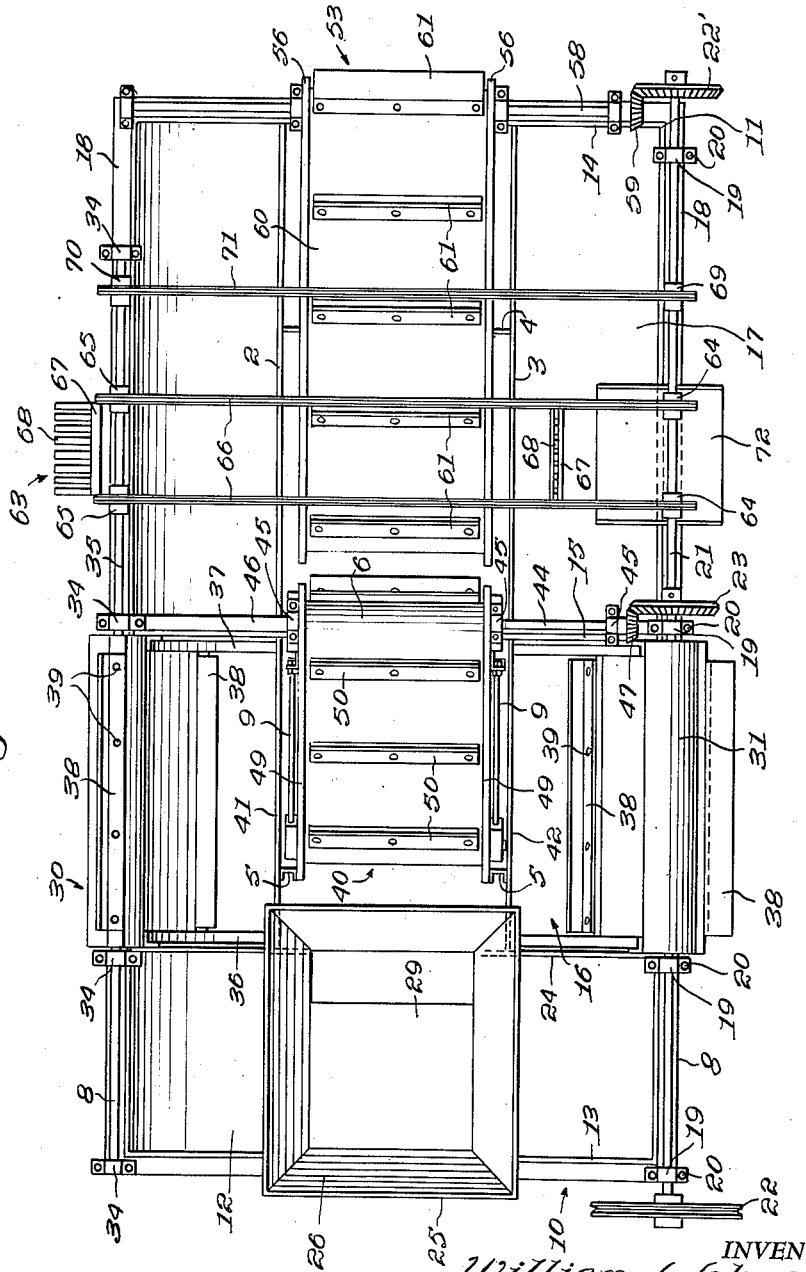

Dec. 18, 1951  W. J. JOHNSON ET AL  2,578,808
POTATO CLEANING AND SEPARATING DEVICE
Filed April 20, 1949  4 Sheets-Sheet 4
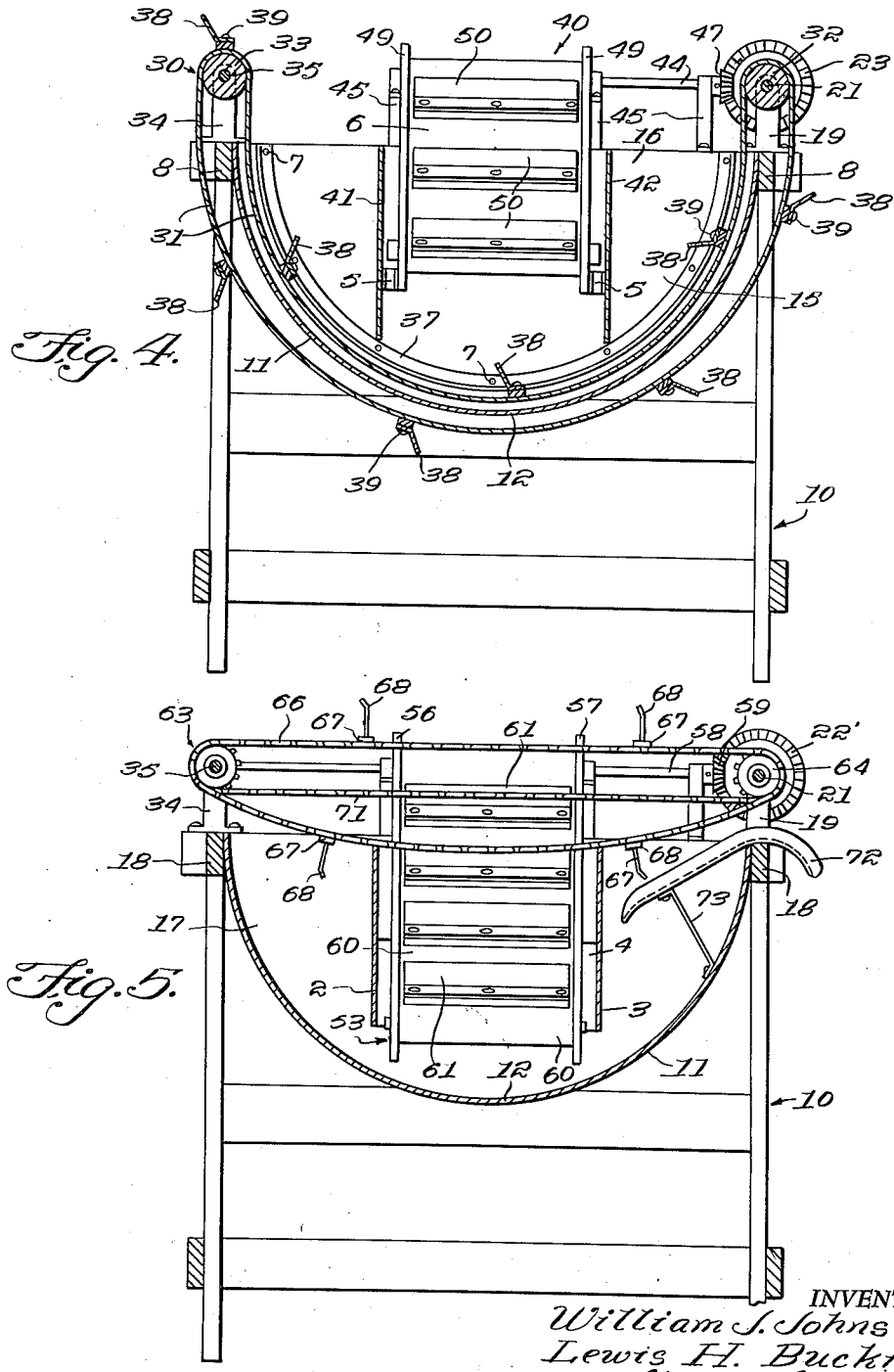
INVENTOR.
William J. Johnson,
Lewis H. Buckner,
BY Victor J. Evans & Co.
ATTORNEYS Patented Dec. 18, 1951

2,578,808

UNITED STATES PATENT OFFICE 2,578,808

POTATO CLEANING AND SEPARATING DEVICE

William J. Johnson and Lewis H. Buckner, Darwin, Calif.

Application April 20, 1949, Serial No. 88,524

2 Claims. (Cl. 209—173)

This invention relates to a potato-processing device, and more particularly to a device for separating potatoes from debris.

The object of the invention is to provide a device for separating detritus from potatoes to clean the latter.

Another object of the invention is to provide a device for receiving potatoes after they have been harvested and separating the debris, such as clods, stones and sticks from the potatoes.

A further object of the invention is to provide a potato-processing device embodying a first chamber containing a brine solution of a sufficient specific gravity to cause the heavier pieces of debris to precipitate to the bottom of the debris while the potatoes float on the surface of the brine solution, and a second chamber containing only water wherein the potatoes are washed and separated from the remaining debris.

Still another object of the invention is to provide a potato-cleaning device which is extremely simple and inexpensive to manufacture.

Other objects and advantages will be apparent during the course of the following description.

In the accompanying drawings forming a part of this application, and in which like numerals are employed to designate like parts throughout the same:

Figure 2 is a vertical longitudinal sectional view of the device;

Figure 3 is a top plan view of the potato-processing device;

Figure 4 is a sectional view taken on the line 4—4 of Figure 2;

Figure 5 is a sectional view taken on the line 5—5 of Figure 2.

Figure 1:
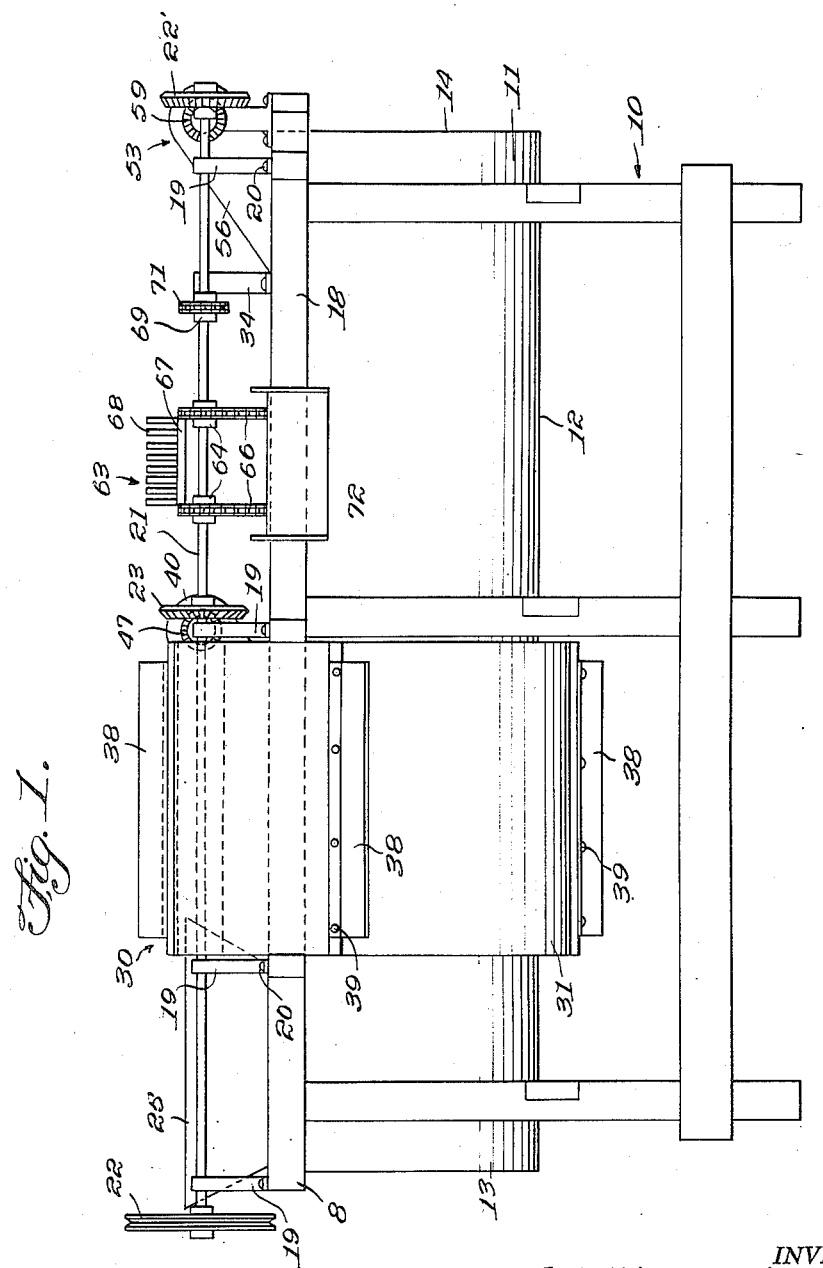
Figure 1 is a side elevational view of the potato-processing device according to the present invention.

Referring in detail to the drawings, the numeral 10 designates a frame preferably fabricated of suitable 2 by 4 and 4 by 4 timber. The frame 10 provides a support for a semi-cylindrical metal tank 11 which is provided with a curved bottom wall 12 and spaced, parallel end walls 13 and 14, Figure 2. Arranged intermediate the end walls 13 and 14 and secured to the bottom wall 12, as by welding, is a partition 15 which defines a first chamber or compartment 16 containing brine therein for a purpose to be later described, and a second chamber 17 containing water therein.

Arranged longitudinally with respect to the tank 11 and supported by the frame 10 are beams 8 and 18. A plurality of spaced bearings 19 are secured to the beams and the frame by rivets or screws 20 and the bearings support a rotatable drive shaft 21. Mounted on one end of the shaft 21 is a pulley 22 which is adapted to be connected by a belt, not shown, which is connected to a suitable power source for rotating the shaft 21. The other end of the shaft 21 has mounted thereon a first bevel gear 22, there being a second bevel gear 23 arranged intermediate the ends of the shaft 21 and connected thereto for a purpose to be subsequently described.

A plate 24, which may be perforated, is disposed transversely within the first chamber 16 and is secured to the bottom wall 12, as by welding. The plate 24 coacts with the end wall 13 to support a hopper 25 which has an open mouth 26 for receiving the potatoes 27 after harvesting. These potatoes contain detritus or debris 28, Figure 2, such as clods, sticks, stones which must be separated before the potatoes are ready for marketing. The hopper 25 is provided with an inclined chute 29 for guiding the potatoes downwardly into the brine chamber 16. In the brine chamber 16, the potatoes 27 float to the surface of the fluid, while the detritus sinks or precipitates to the bottom thereof.

A conveyor 30 is provided for continuously removing the detritus, and this conveyor is arranged transversely with respect to the tank 11. The conveyor 30 embodies a wide belt 31 which is trained over a pair of spaced rollers 32 and 33 that are supported on each side of the tank 11 by bearing blocks 34. The roller 32 is mounted on the drive shaft 21 and driven by the latter, while the other roller 33 is mounted on a driven shaft 35 which is arranged in spaced, parallel relation with respect to the shaft 21 and rotatably supported on the other side of the tank. A pair of curved or arcuate angle irons 36 and 37 are secured to the plate 24 and partition 15, respectively, by rivets 7 and the angle irons 36 and 37 serve as guides to cause the belt 31 to move through the chamber 16 and adjacent the bottom wall 12. A plurality of spaced, parallel angle irons 38 are secured to the belt 31 by rivets 39 and these angle irons 38 gather up the precipitated detritus and carry it out of the chamber.

For moving the potatoes 27 out of the brine chamber 16, an inclined conveyor 40 is provided, there being a pair of spaced, parallel side walls 41 and 42, Figure 4, arranged longitudinally in the chamber 16 for guiding the potatoes onto the conveyor 40. The conveyor 40 includes an upper roller 43 preferably fabricated of wood and mounted on a shaft 44. The shaft 44 is rotatably carried by bearing blocks 45 which are supported by a beam 46, there being a pinion gear 47 mounted on one end of the shaft 44 and the gear 47 is arranged in meshing engagement with the gear 23. A second or lower roller 48 is spaced from the upper roller 43 and is supported by a pair of side members 49. Trained over the rollers 43 and 48 is a suitable belt 6 which has cleats 50 secured thereto for collecting and conveying the floating potatoes from the chamber 16. A suitable shaft and bearing assembly 9 is connected to the conveyor 40 for varying the tension of the belt 49 as desired. Blocks 5 maintain the conveyor 40 centered and anchored between the side walls 41 and 42.

Next, the potatoes leaving the upper end of the conveyor 40 are received and guided by a curved ramp 51 which is secured by rivets 52' to the beam 46. Brackets 52 are secured to the ramp 51 and the brackets 52 are also secured to a pair of spaced, parallel side walls 2 and 3 which serve to guide the potatoes onto an inclined conveyor 53. A plate 4 is arranged in the chamber 17 and serves to help support the conveyor 53. The conveyor 53 includes a lower roller 55, side members 56 for dependingly supporting the roller 55, and an upper roller 57 which is mounted on a shaft 58. The shaft 58 has a small gear 59 on one end which meshes with the gear 22 on the drive shaft 21. Trained over the rollers 55 and 57 is a belt 60 which has angle iron cleats 61 secured thereto for conveying cleaned potatoes out of the chamber 17 for deposit in a suitable container 62.

Any detritus or debris that is on the potatoes is washed off in the second chamber 17 and the debris floats to the surface of the water where it is removed by a transversely-disposed conveyor 63. The conveyor 63 includes a pair of sprockets 64 mounted on the drive shaft 21 and a second pair of sprockets 65 mounted on the shaft 35. Trained over the sprockets 64 and 65 are chains 66, and extending between the chains 66 and secured thereto are support members 67 which carry a plurality of tines 68 for skimming off the floating debris. A sprocket 69 is mounted on drive shaft 21, and a sprocket 70 is arranged in alignment with the sprocket 69 and is mounted on the shaft 35. A chain 71 is trained over the sprockets 69 and 70 for rotating the shaft 35 and controlling the sag in the chains 66. The debris is carried along by the tines 68 and debris is received and guided out of the chamber 17, by a ramp 72 which is supported by braces 73 that are secured to the bottom wall 12 of the tank 11.

In use, potatoes are dumped into the open mouth of the hopper 25 which discharges the potatoes into the bottom of the brine chamber 16. The specific gravity of the brine therein causes the potatoes to rise to the top of the chamber while the detritus or debris sinks or precipitates to the bottom. The debris is constantly being removed from the bottom of the chamber 16 by the transverse conveyor 30 and this debris is carried out of the system. The potatoes floating in the brine chamber 16 are transported by the inclined conveyor 40 to the second chamber 17 which contains only water. Here the potatoes 27 are washed and sink to the bottom of the chamber 17. Any debris that is carried over into the water chamber 17 floats and is continuously skimmed off and removed by the transverse conveyor 63. Finally, the conveyor 53 conveys the cleaned potatoes from the bottom of the chamber 17 where they are ready for packaging and marketing.

As many embodiments may be made of this inventive concept, and as many modifications may be made in the embodiment hereinbefore shown and described, it is to be understood that all matter herein is to be interpreted merely as illustrative and not in a limiting sense.

We claim:

1. In a potato processing device, a frame, a semi-cylindrical tank supported on said frame, said tank having a concave bottom wall and spaced parallel end walls, a partition arranged intermediate the end walls of said tank and secured to said bottom wall to define a first chamber containing brine, and a second chamber containing water, a rotatable drive shaft supported by said frame, a pulley mounted on one end of said drive shaft and adapted to be connected to a power source, a first bevel gear mounted on the other end of said shaft, a plate arranged transversely in said first chamber and cooperating with one of said end walls to provide a supporting assembly, a hopper supported by said assembly for receiving and discharging harvested potatoes into said first chamber, a longitudinally directed inclined conveyor projecting out of said first chamber and located centrally within said chamber for conveying potatoes from the latter to said second chamber, a pair of spaced parallel side walls arranged longitudinally in said first chamber for guiding the potatoes onto said conveyor, a second inclined conveyor projecting out of said second chamber for moving cleaned potatoes out of said second chamber, said second conveyor being longitudinally aligned with said first conveyor, a ramp arranged in said second chamber and positioned between said first and second conveyors for guiding potatoes from said first conveyor onto said second conveyor, a third conveyor including an endless belt having a slack upper run reaching the bottom of the tank for removing detritus from said first chamber, the other run of said belt being exterior of said tank, said third conveyor including a pair of spaced parallel rollers supported on the sides of said tank, said endless belt being arranged transversely of said first chamber and trained over said rollers and mounted for continuous movement through said first chamber, one of said rollers being mounted on said drive shaft, a driven shaft connected to said other roller, and a plurality of spaced angle irons secured to said belt for collecting precipitated detritus from the bottom of said tank and discharging the latter out of said tank.

2. In a potato processing device, a frame, a semi-cylindrical tank supported on said frame, said tank having a concave bottom wall and spaced parallel end walls, a partition arranged intermediate the end walls of said tank and secured to said bottom wall to define a first chamber containing brine, and a second chamber containing water, a rotatable drive shaft supported by said frame, a pulley mounted on one end of said drive shaft and adapted to be connected to a power source, a first bevel gear mounted on the other end of said shaft, a plate arranged transversely in said first chamber and cooperating with one of said end walls to provide a supporting assembly, a hopper supported by said assembly for receiving and discharging harvested potatoes into said first chamber, a longitudinally directed inclined conveyor projecting out of said first chamber and located centrally within said chamber, for conveying potatoes from the latter to said second chamber, a pair of spaced parallel side walls arranged longitudinally in said first chamber for guiding the potatoes onto said conveyor, a second inclined conveyor projecting out of said second chamber and located centrally in said second chamber for moving cleaned potatoes out of said second chamber, a ramp arranged in said second chamber and positioned in alignment with said first and second conveyors for guiding potatoes from said first conveyor onto said second conveyor, a third conveyor including an endless belt having a slack upper run reaching the bottom of said tank for removing detritus from said first chamber, the other run of said belt being arranged exteriorly of said tank, said third conveyor including a pair of spaced parallel rollers supported on the sides of said tank, said endless belt being arranged transversely of said first chamber and trained over said rollers and mounted for continuous movement through said first chamber, one of said rollers being mounted on said drive shaft, a driven shaft connected to said other roller, a plurality of spaced angle irons secured to said belt for collecting precipitated detritus from the bottom of said tank and discharging the latter out of said tank, a conveyor positioned adjacent the top of the liquid in said second chamber and arranged transversely with respect to said second chamber for skimming detritus off of the surface of the water, and vertically disposed spaced parallel side walls arranged adjacent said second conveyor and extending longitudinally in said tank for guiding the potatoes therethrough.

WILLIAM J. JOHNSON.
LEWIS H. BUCKNER.

REFERENCES CITED

The following references are of record in the file of this patent:

UNITED STATES PATENTS

| Number | Name | Date |
| --- | --- | --- |
| 414,962 | Anderson | Nov. 12, 1889 |
| 439,905 | Smith | Nov. 4, 1890 |
| 515,542 | Webb | Feb. 27, 1894 |
| 994,654 | Parker | June 6, 1911 |
| 1,643,596 | Zuckermann | Sept. 27, 1927 |
| 1,754,923 | Weigand | Apr. 15, 1930 |
| 2,108,290 | Levin | Feb. 15, 1938 |
| 2,196,451 | Holzer | Apr. 9, 1940 |
| 2,426,398 | Lathrop | Aug. 26, 1947 |
| 2,465,220 | Garber et al. | Mar. 22, 1949 |

FOREIGN PATENTS

| Number | Country | Date |
| --- | --- | --- |
| 866,046 | France | Mar. 31, 1941 |